No. 808,009. PATENTED DEC. 19, 1905.
B. J. CALDWELL & G. L. HUNT.
CLOTHES LINE REEL.
APPLICATION FILED JAN. 10, 1905.
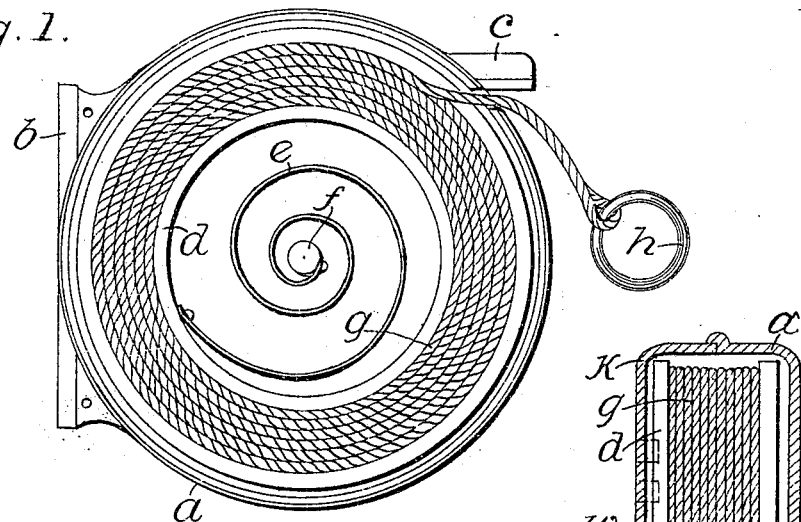
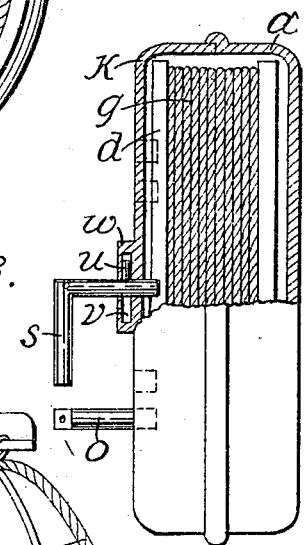
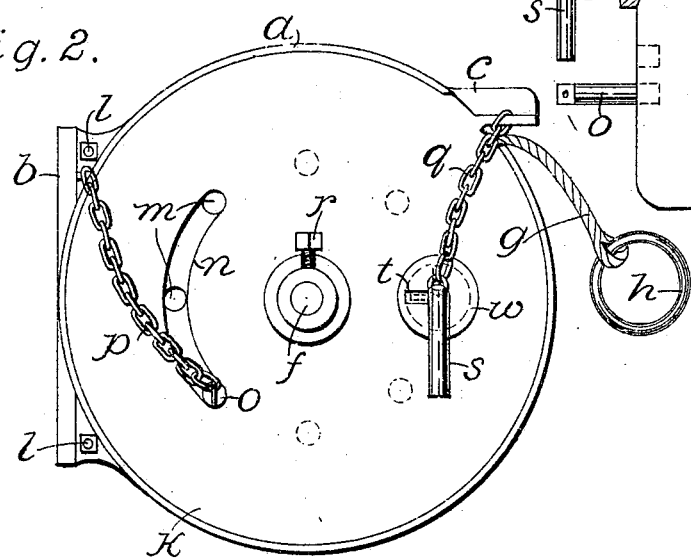
WITNESSES:
BERT. J. CALDWELL and
GEORGE L. HUNT,
INVENTORS
ATTORNEY

UNITED STATES PATENT OFFICE.

BERT J. CALDWELL AND GEORGE L. HUNT, OF WATERLOO, IOWA; SAID CALDWELL ASSIGNOR, BY MESNE ASSIGNMENTS, TO SAID HUNT.

CLOTHES-LINE REEL.

No. 808,009. Specification of Letters Patent. Patented Dec. 19, 1905.

Application filed January 10, 1905. Serial No. 240,392.

*To all whom it may concern:*

Be it known that we, BERT J. CALDWELL and GEORGE L. HUNT, citizens of the United States of America, and residents of Waterloo, Blackhawk county, Iowa, have invented certain new and useful Improvements in Clothes-Line Reels, of which the following is a specification.

This invention relates to clothes-line reels; and it has for its object to provide a construction wherein the spring-returned winding-drum may be locked to render the line of any desired length and having a special means furnished whereby the line may be stretched to take up its slack. This object we have effected by the means which are hereinafter described and claimed and which are illustrated in the accompanying drawings, in which—

Figure 1 is a side elevation of our improved clothes-line reel, showing it with one-half of the casing removed. Fig. 2 is a side elevation of the same, showing the stretching and locking means in position; and Fig. 3 is a front elevation thereof, part of the casing being represented as sectioned away.

Similar letters refer to similar parts throughout the several views.

We understand that spring-controlled winding-drums are not in themselves novel in the art but we have shown means whereby the line when drawn out from the casing of such a drum may be held at any desired length, and we have also added simple and effective means for taking up the slack in the line.

The winding-drum $d$ is contained within a casing composed of the separable halves $a$ and $k$ and is rotatable about a fixed shaft $f$, the latter being fastened to a boss on the casing by means of a set-screw $r$. A helical spring $e$ is placed in the interior of said drum, the inner end of the spring being fastened to the fixed shaft $f$, the outer end being fastened to the drum. The clothes-line $g$ is wound about the outer surface of the drum and its end protrudes through the casing. The outer end of the line is provided with a ring $h$ when desired. The casing has a projection $c$, which serves to cover and keep out moisture from the opening provided for the egress of the line. The casing also has a base-plate $b$, whereby it may be fastened up to a post or side of a building, and the separable halves of the casing are fastened together by means of the bolts $l$. As indicated in Fig. 2, one of the outer sides of the winding-drum $d$ is furnished with a plurality of sockets $m$, arranged in a circle concentric with its shaft. The casing member $k$ is provided with a curved opening $n$, arranged to register with several of said sockets $m$. We have provided a pin $o$, suitably sized to fit the sockets $m$, and said pin may be, if desired, suspended from said base-plate $b$ by means of a chain $p$ or any other means of fastening. The casing member $k$ is also provided with a box $w$, having an opening $t$ communicating with a central circular cavity $v$. The inner part of the opening $t$ passes completely through the casing member $k$ and registers with each of the sockets $m$ when they are under it.

We have provided a simple and effective key $s$ for automatically locking the winding-drum at any desired point, as follows: The key $s$, of angular form, has a ward $u$, which registers with and passes into the outwardly-extending portion of the opening $t$. When the ward $u$ of the key $s$ is placed in the opening $t$, so that its inner end enters any desired socket $m$, its shank $s$ is by the action of gravity caused to drop from the horizontal to the perpendicular position, as shown in Figs. 2 and 3, in which latter position the ward $u$ passes into and is locked against the inner periphery of the circular cavity $v$. The key $s$, which may be suspended from a suitable chain $q$, when in its perpendicular position cannot be dislodged from the opening $t$ by any sudden jar imparted to the casing and can only be removed by elevating its shank to its former horizontal position. It is obvious that by this simple means the winding-drum can be securely locked and that the key automatically assumes its locked position after insertion in the opening by the mere action of gravity.

When the desired length of line has been drawn from the casing and the free end attached to any suitable fixture, the slack may be taken up as follows: The pin $o$ may be inserted through the opening $n$ into whichever socket $m$ is nearest the top of said opening and then may be forced downward, partially rotating the drum $d$, thus taking up the slack in the line $g$. When the slack in the line has been sufficiently taken up and the pin $o$ is in the position shown in Fig. 2, the key $s$ may be inserted in the opening $t$, where it will enter one of the registering sockets $m$, thus locking the winding-drum securely in one position. The shank of the key s will then under the action of gravity assume its perpendicular position, from which it cannot be dislodged except by reversing the process already described.

Having described our invention, what we claim as new, and desire to secure by Letters Patent, is—

1. In a device of the class described, the combination with the casing, of a winding-drum having a plurality of sockets, and an angular gravity-impelled key provided with a stud adapted to enter any one of said sockets to lock said drum in one position within the casing.

2. In a device of the class described, the combination with the perforated casing of a spring-impelled socket-bearing winding-drum rotatably mounted on a fixed shaft therein, a gravity-impelled key adapted to enter the sockets in said drum, and means for locking said key in said casing, and means for rotating said winding-drum through predetermined distances to take up the slack in the line.

3. A clothes-line reel comprising a casing, a spring-impelled winding-drum therein to receive the line, sockets in said drum and registering openings in said casing, means for rotating said drum through predetermined distances to take up the slack in the line, a recessed boss on said casing with an opening registering with any one of said sockets immediately thereunder, and a key adapted to engage the cavity in said boss and such socket to lock the drum in a desired position.

Signed at Waterloo, Iowa, this 20th day of December, 1904.

BERT J. CALDWELL.
GEORGE L. HUNT.

Witnesses:
G. C. KENNEDY,
M. E. KENNEDY.